United States Patent [19]

Fisher

[11] Patent Number: 4,751,631
[45] Date of Patent: Jun. 14, 1988

[54] APPARATUS FOR FAST GENERATION OF SIGNAL SEQUENCES

[75] Inventor: Joseph R. Fisher, Sudbury, Mass.

[73] Assignee: Signal Processing Systems, Inc., Waltham, Mass.

[21] Appl. No.: 463,936

[22] Filed: Feb. 4, 1983

[51] Int. Cl.[4] .............................................. G06F 7/00
[52] U.S. Cl. ....................................... 364/200; 377/49
[58] Field of Search ... 364/200 MS File, 900 MS File, 364/718, 723; 377/52, 107, 108, 110, 33, 34, 35, 44, 49

[56] References Cited

U.S. PATENT DOCUMENTS

| | | | |
|---|---|---|---|
| 3,849,635 | 11/1974 | Freedman | 377/44 |
| 3,943,495 | 3/1976 | Garlic | 364/200 |
| 4,300,234 | 4/1981 | Maruyama et al. | 371/27 |
| 4,442,519 | 4/1984 | Jones et al. | 371/27 |
| 4,538,235 | 8/1985 | Henning | 364/569 |

Primary Examiner—Thomas M. Heckler
Assistant Examiner—Jonathan C. Fairbanks
Attorney, Agent, or Firm—Andrew F. Kehoe

[57] ABSTRACT

A multi-digit, mixed-base or mixed-radix counter of the type used in digital computing devices wherein the value of each digit of the counter is stored in two parts: a first part being the normal numerical value except in certain exceptional cases; and a second part which is zero except in the exceptional cases in which it is a binary one. The exceptional case is when the value to be represented by the counter digit is a terminal digit value, i.e., a maximum digit value when the counter is incrementing or zero value when the counter is decrementing. In the case of a decrementing counter where the normal terminal digit value is a zero, each zero value is replaced with the corresponding maximum digit value for that digit in the first part of the counter, but the second part of the counter identifies in which (if any) of the digits of the first part of the counter such a substitution has been made. This quick-acting counter experiences changes of one digit value at any counting state and can be used to generate sequences of addresses through the addition of successive increments wherein the proper increment is based on the state of only the second part of the counter.

8 Claims, 1 Drawing Sheet

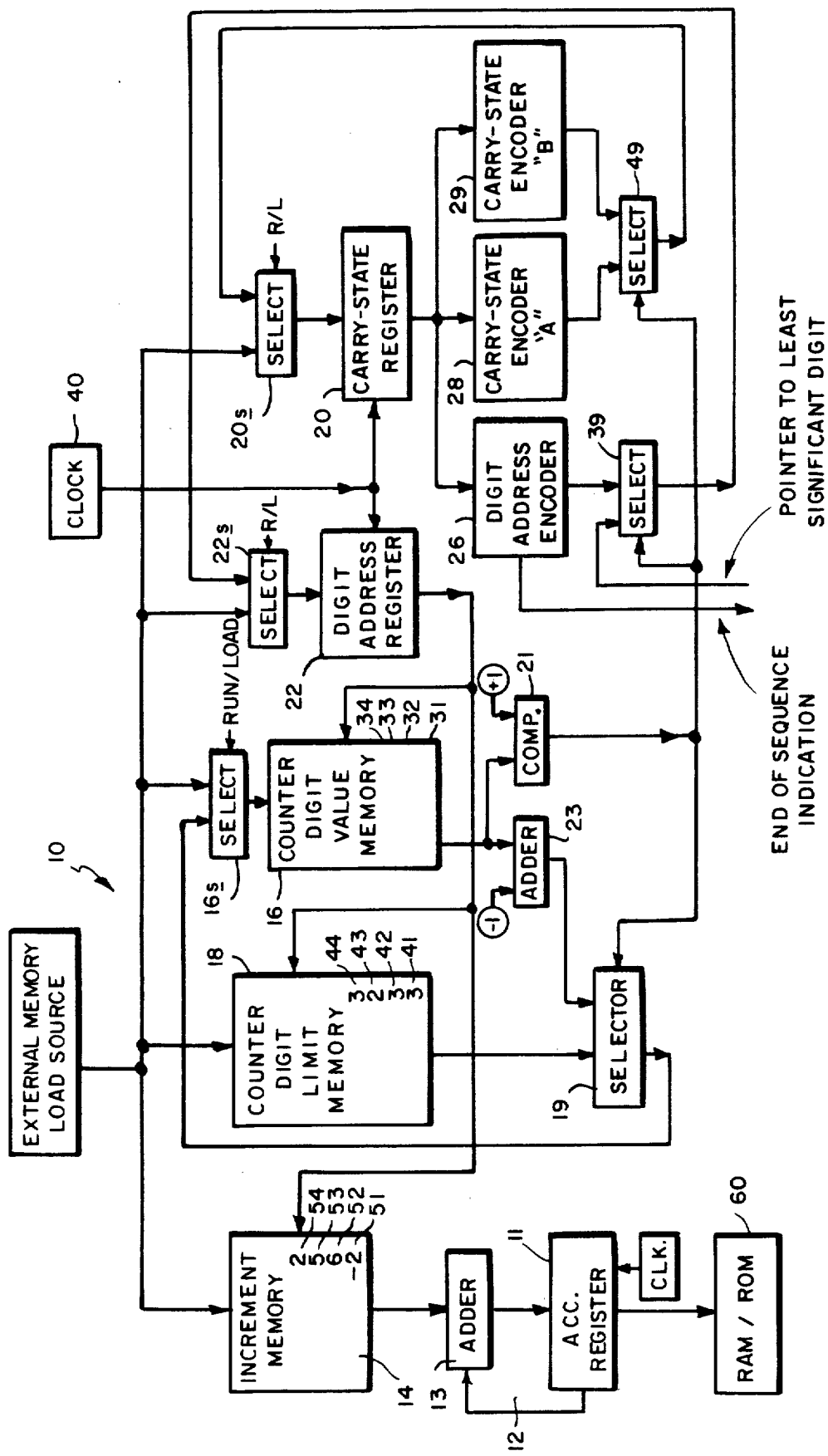

APPARATUS FOR FAST GENERATION OF SIGNAL SEQUENCES

BACKGROUND OF THE INVENTION

This invention relates to digital computing devices which generate sequences of numerical values, e.g., sequences of memory addresses. Circuits for this purpose are commonly incorporated into "block transfer controllers" and similar input/output controllers for peripheral devices attached to a digital data processing system as well as into the logic by which arithmetic processors access their supporting memories. The class of computing devices incorporating circuits similar to block transfer controllers includes array processors.

The apparatus commonly used for generating such sequences of numerical values has the capability to generate sequential numerical values beginning at a given value and increasing (or decreasing), by a fixed increment, either a specified number of times or until a specified limit is reached or exceeded (e.g., 17, 18, 19, . . . , 1229). If a more complicated sequence of integer values is to be generated (e.g., 17, 18, 19, 25, 26, 27, 33, 34, 35, . . . , 81, 82, 83) in which a second increment (6, i.e., the difference between 19 and 25) is used whenever the first increment (1, i.e., the difference between 17 and 18) has been used a certain number of times (or more generally, when two or more increments—positive or negative or zero—are to be used in order each after the preceding increment in order has been used a characteristic number of times) the capability of most such circuits will be exceeded because of the amount of computing hardware or computing time that is required.

Thus, when apparatus for generating such sequences is required, the desired sequence is broken up into a number of subsequences each using a single increment. A central processing unit, or some other programmable processing unit, initializes a sequencing circuit for such subsequences. Such intervention by a separately-programmed processing unit has the effect of reducing the speed with which such complicated sequences of numerical values can be generated. Direct methods for generating such sequences of numerical values are known, but they are relatively complex and have structural characteristics which limit their speed.

A class of numerical sequences which can be advantageously generated by the invention described below are those with values defined by the formula of Equation A:

$$Z = W_0 + \sum_{j=1}^{k} W_j X_j$$

where numbers $W_0, W_1, \ldots, W_k$ are any arbitrary weights, i.e., constants, which determine, by means to be described later (see equation B, known to the art) the increments between successive values of the numerical sequence to be generated, where the numbers $X_j$ are non-negative integer indicies with each integer $X_j$ being in the range $0 \leq X \leq R_j - 1$ for some specified integer $R_j$ which is referred to as the radix of $X_j$, and where the set of indicies $$(X_k, X_{k-1}, \ldots, X_2, X_1)$$

progresses through a sequence of values starting with some value (most commonly all zeros) and changing as the digits of a counter. To illustrate, a three digit counter of this type with radicies (2, 5, 3) would sequence through the following sets of index values:

| $X_3$ | $X_2$ | $X_1$ |
|---|---|---|
| 0 | 0 | 0 |
| 0 | 0 | 1 |
| 0 | 0 | 2 |
| 0 | 1 | 0 |
| 0 | 1 | 1 |
| 0 | 1 | 2 |
| 0 | 2 | 0 |
| . | . | . |
| 0 | 4 | 2 |
| 1 | 0 | 0 |
| . | . | . |
| 1 | 4 | 2 |
| 0 | 0 | 0 | where the last two lines illustrate the counter reaching its maximum value (142) and then resetting to the initial value.

The procedure will be seen to be somewhat similar to a common odometer except the radicies are 2, 5, and 3 in the example set forth above, instead of 10, 10, and 10 as in the case of an odometer. Thus, such a sequence of index values is equivalent to the state of a multidigit counter in which different digits may have different maximum values. As with an odometer, there are many states in the counting sequence at which two or more digits change at the same time. More specifically, when any digit of the counter is incremented, the all more-frequently-changing digits (if any) are simultaneously reset to zero. This makes it necessary either to have sufficient hardware to change all digits as necessary or to take extra time to change the several digits sequentially.

Counter circuits using binary logic often count backwards starting with the "largest" count (142 in the example) as illustrated below.

| $X_3$ | $X_2$ | $X_1$ |
|---|---|---|
| 1 | 4 | 2 |
| 1 | 4 | 1 |
| 1 | 4 | 0 |
| 1 | 3 | 2 |
| 1 | 3 | 1 |
| 1 | 3 | 0 |
| 1 | 2 | 2 |
| 1 | 2 | 1 |
| . | . | . |
| 1 | 0 | 0 |
| 0 | 4 | 2 |
| 0 | 4 | 1 |
| . | . | . |
| 0 | 0 | 0 |
| 1 | 4 | 2 |

Such backwards counters are known to be—in principle, as opposed to specific function—equivalent to normal forward counters. Like forward counting counters, such backwards counters also experience changes of two or more digits between many states. Specifically when a counter digit decreases then all more-frequently-changing digits are reset to their maximum values.

For a specific set of radicies ($R_j$) and a specific set of weights ($W_j$) each set of index values yields a specific element of the resulting numerical sequence Z.

If weights $W_0=6$, $W_1=2$, $W_2=-1$, $W_3=5$ are specified, then using Equation A, the incrementing counter illustrated above generates the following numerical sequence:

$$6 + 2 \cdot 0 + (-1) \cdot 0 + 5 \cdot 0 = 6$$
$$6 + 2 \cdot 1 + (-1) \cdot 0 + 5 \cdot 0 = 8$$
$$6 + 2 \cdot 2 + (-1) \cdot 0 + 5 \cdot 0 = 10$$
$$6 + 2 \cdot 0 + (-1) \cdot 1 + 5 \cdot 0 = 5$$
$$6 + 2 \cdot 1 + (-1) \cdot 1 + 5 \cdot 0 = 7$$
$$6 + 2 \cdot 2 + (-1) \cdot 1 + 5 \cdot 0 = 9$$
$$6 + 2 \cdot 0 + (-1) \cdot 2 + 5 \cdot 0 = 4$$
$$6 + 2 \cdot 1 + (-1) \cdot 2 + 5 \cdot 0 = 6$$
$$\vdots$$
$$6 + 2 \cdot 2 + (-1) \cdot 4 + 5 \cdot 0 = 6$$
$$6 + 2 \cdot 0 + (-1) \cdot 0 + 5 \cdot 1 = 11$$
$$\vdots$$
$$6 + 2 \cdot 2 + (-1) \cdot 4 + 5 \cdot 1 = 11$$

Since when a digit is incremented, all more-frequently-changing digits are reset to zero, the difference between the numerical sequence values associated with two consecutive states is equal to the weight assigned to the least-frequently-changing digit which changes between those two states less the sum of the products of the maximum value of each other changing digit with the weights assigned to the corresponding digits. Thus, the effect of incrementing $X_1$ is to increase the numerical sequence value by $W_1=2$; the effect of incrementing $X_2$ is to increase the numerical sequence value by $W_2-2 \cdot W_1 = -5$, and the effect of incrementing $X_3$ is to increase the numerical sequence value by $W_3-2 \cdot W_1-4 \cdot W_2=5-2 \cdot 2-4 \cdot (-1)=5$. The effect of decrementing these digits in a decrementing counter with the same weights is to decrease the numerical sequence value by the amounts of increase mentioned above for the incrementing mode.

The circuitry necessary to generate a sequence of numerical values by the addition of properly chosen increments (either positive, negative or zero) is known to be much simpler than to generate the same sequence by directly evaluating Equation A.

SUMMARY OF THE INVENTION

The principal object of the invention is to provide a computing apparatus and method which will generate certain types of numerical sequences more rapidly than previous apparatus or generate such sequences at high speed with less circuit complexitiy than with previous apparatus.

This invention deals with a particularly efficient apparatus for implementing mixed-radix counters (counters in which the different digits have different radicies) using the equivalent of "carry-look-ahead" techniques which are often used with conventional binary counters. When the counter is used to generate a sequence of numerical values or addresses, the superior "carry-look-ahead" apparatus, i.e., the second part of the counter, of this invention also determines the increment between such consecutive numerical values or addresses.

Applicant has provided a multi-digit, mixed radix counter apparatus in which each digit value of the counter is stored in two parts. The first part contains the digit value itself except in certain cases. The second part contains one binary digit for each digit of the counter (regardless of the radix of that digit) and the value of each binary digit is zero except in the cases where the corresponding digit in the first part of the counter does not contain the digit value.

The invention applies to both incrementing and decrementing counters.

In the incrementing mode, the exceptional case is when the maximum value of a digit is to be represented. In this case the digit is set instead to zero in the first part of the counter and the corresponding bit in the second part of the counter is set to a one so as to allow the counter as a whole to recognize the substitution.

In the decrementing mode, the exceptional case is when a zero digit value is to be represented in which case the maximum digit value is stored in the first part and a one is stored in the corresponding bit in the second part. "Zero" and "one" in this context represent only the conventional language used to describe opposite logical states in digital logic terminology.

The apparatus also comprises an incrementing or decrementing means for both states of the counter apparatus, and a means for generating the numerical sequence of values Z by addition of selected increments (positive, negative or zero). In addition, rather than numerical sequences, the counter apparatus can be utilized to generate signals for hardware operating sequences of events, including control of mechanical and optical equipment.

In practice, the invention finds particular value in generation of such numerical values as are useful in address generation circuits of data processing and array processing apparatus. In such apparatus, a numerical sequence may be generated by successive incrementation or decrementation of an initial value utilizing a multi-stage counter as described above. In such apparatus the state of the counter is used for selecting the increment and the increment selected is added to the previous member of the sequence to produce the next member of the sequence.

In one valuable embodiment of the invention, the selection of a proper increment (i.e, the difference between two successive values of Z) is based not on the first part, but on only the second part, described above, of the counter apparatus.

In such an embodiment this invention makes use of the fact that in the resulting numerical sequence the difference between any two consecutive sequence elements is determined entirely by the corresponding consecutive sets of index values and more specifically by the left-most (i.e., the least-rapidly-changing) index which differs between the two consecutive sets of index values.

ILLUSTRATIVE EMBODIMENT OF THE INVENTION

In this application and accompanying drawings there is shown an described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

BRIEF DESCRIPTION OF THE DRAWINGS

The drawing schematically depicts an illustrative embodiment of a circuit utilizing this invention using the two-part counting procedure in an address-generating mode. Moreover, it should be understood that the following description is made with respect to a decrementing operation of a counter. It should be clear, on reading this disclosure, that an equivalent procedure applies to the incrementing operation of a counter.

In reviewing these drawings it should be understood that certain elements, increment memory 14, accumulator 12, and memory unit 60 are utilized in a particular embodiment of the invention, i.e., an address generator. The sequence of signal outputs from the apparatus of the invention can also be utilized in any number of other applications.

Referring to the drawing, it is seen that an address generator apparatus 10 operates as follows:

A desired numerical sequence generated appears as consecutive values in time at the output of the register 11 of accumulator 12 which is modified at each step in time by the adder 13 by an increment accessed from the increment memory 14.

The counter state is represented by the set of index or digit values stored in different storage locations in the counter digit value memory 16 and the maximum value of each index or digit is stored in the corresponding storage location in the counter digit limit memory 18.

The operation is best described with reference to a specific set of radicies: 4, 3, 4, 4, and a set of weights $W_0=5$, $W_1=2$, $W_2=0$, $W_3=1$, $W_4=6$.

In known procedures, the first few values of a four-digit counter with radicies 4, 3, 4, 4, counting down (decrement mode) from the maximum are:

| $X_4$ | $X_3$ | $X_2$ | $X_1$ |
|---|---|---|---|
| 3 | 2 | 3 | 3 |
| 3 | 2 | 3 | 2 |
| 3 | 2 | 3 | 1 |
| 3 | 2 | 3 | 0 |
| 3 | 2 | 2 | 3 |

The resulting numerical sequence values according to Equation A are:

$5+2\cdot3+0\cdot3+1\cdot2+6\cdot3=31$ $5+2\cdot2+0\cdot3+1\cdot2+6\cdot3=29$ $5+2\cdot1+0\cdot3+1\cdot2+6\cdot3=27$ $5+2\cdot0+0\cdot3+1\cdot2+6\cdot3=25$ $5+2\cdot3+0\cdot2+1\cdot2+6\cdot3=31$ Thus in the prior art, for the first four counts, only the most frequently varying index or digit changes, but at the fifth count, the next most frequently varying digit changes as well. With known apparatus, such multiple digit changes would require changing the contents of more than one storage location and consequently would require extra control circuitry and would slow the counting operation.

In the apparatus of the invention, multiple digit changes are avoided by providing means to represent any index value of zero by the maximum value of that index together with a "one" state in the corresponding bit in the second part of the counter, a carry-state-register 20.

Using the apparatus of this invention, one generates, instead, the following values:

| | | | |
|---|---|---|---|
| 3 | 2 | 3 | 3 |
| 3 | 2 | 3 | 2 |
| 3 | 2 | 3 | 1 |
| 3 | 2 | 3 | <u>3</u> |
| 3 | 2 | 2 | 3 | where a digit is underscored if the corresponding bit in the carry-state-register 20 is a "one".

The next consecutive values according to this example of the invention would be:

| | | | |
|---|---|---|---|
| 3 | 2 | 2 | 2 |
| 3 | 2 | 2 | 1 |
| 3 | 2 | 2 | <u>3</u> |
| 3 | 2 | 1 | <u>3</u> |
| 3 | 2 | 1 | 2 |
| 3 | 2 | 1 | 1 |
| 3 | 2 | 1 | <u>3</u> |
| 3 | 2 | <u>3</u> | <u>3</u> |
| 3 | 2 | <u>3</u> | 2 |
| 3 | 2 | <u>3</u> | 1 |
| 3 | 2 | <u>3</u> | <u>3</u> |
| 3 | 1 | <u>3</u> | <u>3</u> |

Note that in utilizing the apparatus between any two consecutive steps of counting, at most one digit changes value whereas with a conventional counter of the prior art one or more digits (and at certain steps all digits) change. Note also that, the digit which changes is the right-most digit that is not underscored, and that all bits in the carry state corresponding to digits to the right of the changing digit are cleared to zero, i.e., all underscores to the right of the changing digit are removed.

These rules are further illustrated in the next few consecutive values of the counter where in this portion of the example, the values contained in the first and second parts of the counter are also shown explicitly:

| MODIFIED COUNTER | | | | FIRST PART OF COUNTER | | | | SECOND PART OF COUNTER | | | |
|---|---|---|---|---|---|---|---|---|---|---|---|
| 3 | 1 | 3 | 2 | 3 | 1 | 3 | 2 | 0 | 0 | 0 | 0 |
| 3 | 1 | 3 | 1 | 3 | 1 | 3 | 1 | 0 | 0 | 0 | 0 |
| 3 | 1 | 3 | <u>3</u> | 3 | 1 | 3 | 3 | 0 | 0 | 0 | 1 |
| 3 | 1 | 2 | <u>3</u> | 3 | 1 | 2 | 3 | 0 | 0 | 0 | 0 |
| 3 | 1 | 2 | 2 | 3 | 1 | 2 | 2 | 0 | 0 | 0 | 0 |
| 3 | 1 | 2 | 1 | 3 | 1 | 2 | 1 | 0 | 0 | 0 | 0 |
| 3 | 1 | 2 | <u>3</u> | 3 | 1 | 2 | 3 | 0 | 0 | 0 | 1 |
| 3 | 1 | 1 | <u>3</u> | 3 | 1 | 1 | 3 | 0 | 0 | 0 | 0 |
| 3 | 1 | 1 | 2 | 3 | 1 | 1 | 2 | 0 | 0 | 0 | 0 |
| 3 | 1 | 1 | 1 | 3 | 1 | 1 | 1 | 0 | 0 | 0 | 0 |
| 3 | 1 | 1 | <u>3</u> | 3 | 1 | 1 | 3 | 0 | 0 | 0 | 1 |
| 3 | 1 | <u>3</u> | <u>3</u> | 3 | 1 | 3 | 3 | 0 | 0 | 1 | 0 |
| 3 | 1 | <u>3</u> | 2 | 3 | 1 | 3 | 2 | 0 | 0 | 1 | 0 |
| 3 | 1 | <u>3</u> | 1 | 3 | 1 | 3 | 1 | 0 | 0 | 1 | 0 |
| 3 | 1 | <u>3</u> | <u>3</u> | 3 | 1 | 3 | 3 | 0 | 0 | 1 | 1 |
| 3 | 2 | <u>3</u> | <u>3</u> | 3 | 2 | 3 | 3 | 0 | 1 | 0 | 0 |
| . | . | . | . | . | . | . | . | . | . | . | . |
| <u>3</u> | <u>2</u> | <u>3</u> | 1 | 3 | 2 | 3 | 1 | 1 | 1 | 1 | 0 |
| <u>3</u> | <u>2</u> | <u>3</u> | <u>3</u> | 3 | 2 | 3 | 3 | 1 | 1 | 1 | 1 |

The above example illustrates that in the first part of the counter only one digit changes in going from one counter state to the next and that the digit which changes is the one corresponding to the right-most zero in the second part of the counter at the earlier of the two states.

Referring to FIG. 1, the counter digit value memory 16 contains one memory storage location (schematically indicated at 31, 32, 33, and 34) for each digit of the counter and that storage location contains the present value of that digit. Similarly, FIG. 1 identifies memory locations in counter digit limit memory 18 as 41, 42, 43, 44 and increment memory 14 as 51, 52, 53 and 54.

The counter digit limit memory 18 has an equal number of storage locations and stores the maximum value of each digit in the location corresponding to the location of the digit value in the counter digit value memory. The carry-state register 20 has one bit for each digit of the counter and the digit address register 22 contains a number which is essentially the number of the digit which is to be changed at the next step of the counter. This number points to the location in the counter digit value memory 16 and the counter digit limit memory 18 of the current and maximum values for the digit to be changed. When used for address generation the contents of the digit address register 22 also point to the corresponding location in the increment memory 14 which contains the amount by which the final resulting numerical sequence value is to change between the current and next counter values. Prior to operation the contents of the several memories and registers must be initialized by an auxiliary device. Such procedures are well known in the art.

When used for counting downwards, each digit value in the counter digit value memory 16 is initialized to its maximum value, the digit address register 22 is initialized to point to the most rapidly varying digit (the right-most digit) and the carry-state register 20 is set to all zeros. The accumulator register 11 is set to the value $W_0$.

The location in the increment memory 14 corresponding to the Kth digit, or index, is initialized as shown as in Equation B shown below, to the value.

$$I_K = \begin{bmatrix} W_1, \text{ for } K = 1 \\ W_K - \sum_{j=1}^{K-1} W_j(R_j - 1), \text{ for } K = 1 \end{bmatrix}$$

$I_k$ equals the increment to value of Z (see Equation A) associated with a change in the index value $X_K$.

For the set of radicies 4, 3, 4, 4, and the weights selected to illustrate the increments would be as follows: $I_1 = -2$, $I_2 = 6$, $I_3 = 5$, $I_4 = 2$.

To reach the next counter state and to generate the next value of the resulting numerical sequence, the following events take place:

(1) The increment memory 14 is read at the location identified by the digit address register 22 and the increment read is added to the contents of the accumulator register 11 to create the next value of the resulting numerical sequence.

(2) The Counter Digit Limit Memory 18 is read at the location pointed to by the Digit Address Register 22.

(3) The counter digit value memory 16 is read at the location pointed to by the digit address register 22 and the value read is compared by comparator 21 with the constant 1.

If the value is not 1

(a) the value read less one (as computed by adder 23) is stored back into the same location in the counter digit value memory 16, (b) all non-zero bits (if any) in the carry state register 20 to the right of the bit corresponding to the digit read are set to zero and (c) the digit address register 22 is set up to point to the least significant digit of the counter.

If the value read from the counter digit value memory is a 1, (d) the maximum digit value read from the corresponding location of the counter digit limit memory 18 is written into the corresponding location of the counter digit value memory 16, (e) the bit in the carry state register 20 corresponding to the digit read is set to one and all non-zero bits (if any) in the carry state register 20 to the right of that bit are cleared, and (f) the digit address register 22 is set to point to a digit of the counter determined by the bits of the carry-state register 20 as they were prior to the modification at (e) above as indicated by the parallism between 20, 26 and 39 on the one hand and 20, 28, 29 and 49. The digit address register is set to point to the counter digit corresponding to the bit of the carry-state register 20 containing the second zero as encountered in scanning from the least significant to the most significant bit.

The updating of the carry state register 20 and the digit address register 22, described above, can be accomplished with a priority encoder circuit or with read-only-memory, or by other means known to those skilled in the art of such data processing equipment.

Selector 19, 49, and 39 function to select between items (a) and (d), (b) and (e), and (c) and (f) respectively above depending upon the output of comparator 21.

If the apparatus of the invention is to be used to generate the same numerical sequence repeatedly with the counter value recycling from the last value back to the first (from 3 2 3 3 to 3 2 3 3 in the example) then an extra digit is added to the counter. The radix of this digit is immaterial and its weight $W_k + 1$ is selected based on the desired continuation of the numerical sequence. Step 3e) above is modified with respect to this digit in that the bit of the carry state register 20 corresponding to this digit is never set to a 1.

The output from accumulator register 11, i.e, a sequence of addresses, is then utilized as address input to a memory device 60, as desired for a particular application.

It is convenient to explain the digit address encoder and carry-state encoders by indicating their output for each possible input.

(1) If the input to encoder 26 (from the carry-state register 20) has a zero as its least significant bit and has at least one other zero, then the output of the encoder 26 is a value which points to the counter digit corresponding to the second zero of the carry state register as determined by scanning from the right. (Thus, if the second "0" from the right is the third bit from the right, the output of encoder 26 is representative of that position, e.g., "3".)

(2) If the right-most bit position of the input is a one, then the output is a value which points to the least significant digit of the counter.

(3) If the least significant bit of the input is "zero", but all remaining bits are "ones", then the output is a value which indicates that the counter sequence is completed. In the case where continued generation of the numerical sequence is desired, the bit of the carry state register corresponding to the most significant digit of the counter is never set to a "one", so counting never halts.

Carry State Encoder A 28 and Carry State Encoder B 29 have as their inputs the state of the carry state register 20 which may be represented by a binary number. These encoders both generate output values which may be loaded into the carry state register through selector 20s; thus, the operation of these encoders may be described as modification of the states of the bits of the carry state register.

Carry State Encoder A (28) may operate as follows. The right-most zero bit of the input is found by scanning. In the output (1) all bits to the right of this right-most zero are set to zero and (2) all bits (0s or 1s) to the left of and including the right-most zero are output in their original input state.

Carry State Encoder B (29) operates like Carry State Encoder A except that it provides that the right-most 0 (input) is also replaced by a 1 in its output.

Selectors 16s, 22s, and 20s are utilized in selecting input to the counter digit value memory 16, digit address register 22, and carry state register 20, respectively. The input is either selected from an external source (for initiallizing to appropriate values prior to actual operation) or from the circuitry of the counter 10 described herein during counter operation.

The clock 40 as known in the art, is a signal which causes registers to change their output states.

It is also to be understood that the following claims are intended to cover all of the generic and specific features of the invention herein described and all statements of the scope of the invention which might be said to fall therebetween.

What is claimed:

1. A decrementing counter apparatus for counting numbers having more than one digit sequence in which the radices of each digit sequence can be different, and in which the value of each digit sequence separately and the overall value of all sequences is represented by a combined state of first and second counter parts comprising:
 first counter part means to indicate the state of
 (a) a numerical value of each of said digit sequence when a digit value of said sequence is not the minimum value of at least one said sequence, and
 (b) the maximum value of said digit sequence when said digit value of said sequence is the minimum value of said sequence;
 second counter part means, which is an "extreme" value part, with respect to each digit sequence, to be in a state indicative of whether or not said digit value of said sequence is equal to its minimum value;
 output means to represent the decrementing value of each digit value of all said digit sequences of a number being counted; and means for combining the states of said first and second counter parts, into said output means.

2. Counter apparatus as described in claim 1 wherein said apparatus is a mixed radix counter.

3. A counter apparatus for counting numbers having more than one digit sequence in which the radices of each digit sequence can be different, and in which the value of each digit sequence separately and the overall value of all sequences is represented by a combined state of first and second counter parts comprising:
 first counter part means to indicate the state of
 (a) a numerical value of each said digit sequence when a digit value of said sequence is not the maximum value of at at least one said sequence, and
 (b) the minimum value of said digit sequence when said digit value of said sequence is the maximum value of said sequence;
 second counter part means, which is an "extreme" value part, with respect to each digit sequence, to be in a state indicative of whether or not said digit value of said sequence is equal to its maximum value;
 output means to represent the values of each digit value of all said digit sequences of a number being counted; and
 means for combining the states of said first and second counter parts, into said output means.

4. A counter apparatus as described in claim 3 wherein said apparatus is a mixed radix counter.

5. An address generator comprising:
 (A) a decrementing counter apparatus for counting numbers having more than one digit sequence in which the radices of each digit sequence can be different, and in which the value of each digit sequence separately, and the overall value of all sequences, is represented by a combined state of first and second counter parts comprising:
 first counter part means to indicate the state of
 (a) a numerical value of each said digit sequence when a digit value of said sequence is not the minimum value of at least one said sequence, and
 (b) the maximum value of said digit sequence when said digit value of said sequence is the minimum valud of said sequence;
 second counter part means, which is an "extreme" value part, with respect to each digit squence, to be in a state indicative of whether or not said digit value of said sequence is equal to its minimum value;
 output means to represent the decrementing values of each digit value of all said digit sequences of a number being counted; and
 means for combining the states of said first and second counter parts, into said output means; and, additionally, comprises;
 (B) memory storage means connected to the output means for storing each decrement of each number generated by the counter defined in (A); and
 (C) accumulator register means connected to the memory storage means for generating addresses.

6. An address generator comprising:
 (A) a counter apparatus for counting numbers having more than one digit sequence in which the radices of each digit sequence can be different, and in which the value of each digit sequence separately and the overall value of all sequences is represented by a combined state of first and second counter parts comprising:
 first counter part means to indicate the state of
 (a) a numerical value of each said digit sequence when a digit value of said sequence is not the maximum value of at least one said sequence, and
 (b) the minimum value of said digit sequence when said digit value of said sequence is the maximum value of said sequence;
 second counter part means, which is an "extreme" value part, with respect to each digit sequence, to be in a state indicative of whether or not said digit value of said sequence is equal to its maximum value;

output means to represent the incrementing values of each digit value of all said digit sequences of a number being counted; and means for combining the states of said first and second counter parts, into said output means; and additionally comprises;

(B) memory storage means connected to the output means for storing each increment of each number generated by the counter defined in (A); and (C) accumulator register means connected to the memory storage means for generating addresses from said numbers.

7. A method for operating a decrementing counter apparatus comprising means for counting numbers comprising more than one digit sequence in which the radix of each digit sequence can be different, and in which the value of each digit sequence separately and the overall value of all sequences is represented by the combined state of counter parts, said method comprising the steps of (a) indicating with a first counter part (1) a numerical identity of each said digit sequence when a digit value of said sequence is not the minimum value of said sequence, and (2) the maximum value of said digit sequence when said digit value of said sequence is the minimum value of said sequences;

(b) indicating with a second counter part whether or not said digit value of said sequence is equal to its minimum value; and (c) combining states of said first and second counter parts, from the said decrementing counter to represent the decrementing values of each digit value of all said digit sequences in the number being counted.

8. A method for operating an incrementing counter apparatus comprising means for counting numbers comprising more than one digit sequence in which the radices of each digit sequence can be different, and in which the value of each digit sequence separately and the overall value of all sequences is represented by the combined state of counter parts, said method comprising the steps of (a) indicating with a first counter part (1) a numerical identity of each said digit sequence when a digit value of said sequence is not the maximum value of said sequence, and (2) the minimum value of said digit sequence when said digit value of said sequence is the maximum value of said sequence;

(b) indicating with a second counter part whether or not said digit value of said sequence is equal to its maximum value, and (c) combining states of said first and second counter parts from the said incrementing counter to represent the incrementing values of each digit value of all said digit sequences in the number being counted.

* * * * *